United States Patent Office 3,432,342
Patented Mar. 11, 1969

3,432,342
EPOXYALKYLDIOXANES AND THEIR USE AS TEXTILE FINISHING AGENTS
Samuel W. Tinsley, Charleston, W. Va., and Paul A. King, Warwick, N.Y., assignors to Union Carbide Corporation, a corporation of New York
No Drawing. Filed June 9, 1965, Ser. No. 462,752
U.S. Cl. 117—139.4                                  8 Claims
Int. Cl. C08j 1/00; C07d 15/12

ABSTRACT OF THE DISCLOSURE

A composition is disclosed comprising epoxyalkyl dioxanes and their use as textile finishing agents. Specific epoxides that may be prepared and used in such a manner include 2,5-bis(1,2-epoxyethyl)-1,4-dioxane; 2,6-bis(1,2-epoxyethyl)-1,4-dioxane; 2 - (1,2-epoxyethyl)-5-vinyl-1,4-dioxane; 2-(1,2-epoxyethyl)-6-vinyl-1,4-dioxane; 2-allyl-3-(2,3-epoxypropyl)-1,4-dioxane and 2,3 - bis(2,3-epoxypropyl)-1,4-dioxane.

---

This invention relates to a novel class of oxirane substituted 1,4-dioxanes wherein the moiety possessing the oxirane group is directly bonded to the dioxane ring by stable saturated carbon to carbon bonds. Moreover, this invention relates to resin compositions, cured resins and the like, that are obtained by use of the novel oxirane substituted 1,4-dioxanes of this invention. Most particularly, this invention encompasses the use of the novel oxirane substituted 1,4-dioxanes as improved wash and wear finishes for fabrics such as cotton, rayon, and the like, which because of the aforementioned stable saturated carbon to carbon bond exhibit unexpectedly long wash and wear life.

The novel 1,4-dioxanes of this invention contain one or two acyclic substituents, at least one of which contains an oxirane moiety. These substitutents are present on the 1,4-dioxane ring in any of the 2, 3, 5, and 6 positions thereof. When only one oxirane substituted group is bonded to the dioxane ring, an ethylenically unsaturated acyclic group is also directly bonded to the dioxane ring at one of the remaining carbons which is free of said oxirane substituted group. In all cases one of said oxirane substituted group and ethylenically unsaturated containing group is bonded to the 1,4-dioxane ring in the 2 position. The ethylenically unsaturated acyclic monovalent hydrocarbon group is free of oxirane oxygen.

The above novel compounds are characterized by the following formula:

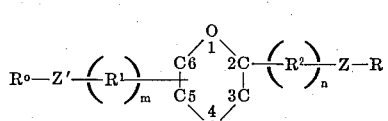

wherein R and R° are each one of hydrogen, vicinal epoxyalkyl of from 2 to about 8 carbon atoms, alkyl of from 1 to about 8 carbon atoms and alkenyl of from 1 to about 8 carbon atoms; $R^1$ and $R^2$ are each one of alkylene and alkenylene, each of from 1 to about 12 carbon atoms; Z and Z' are one of

and

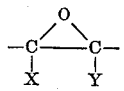

wherein X and Y are each one of hydrogen and alkyl of from 1 to about 4 carbon atoms; at least one of Z and Z' is

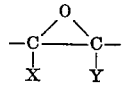

and n and m are each one of the integers 0 and 1.

Illustrative of oxirane substituted acyclic monovalent hydrocarbon groups and ethylenically unsaturated acyclic monovalent hydrocarbon groups that can be bonded to the dioxane moiety as characterized by the above formula and description include, e.g., the following:

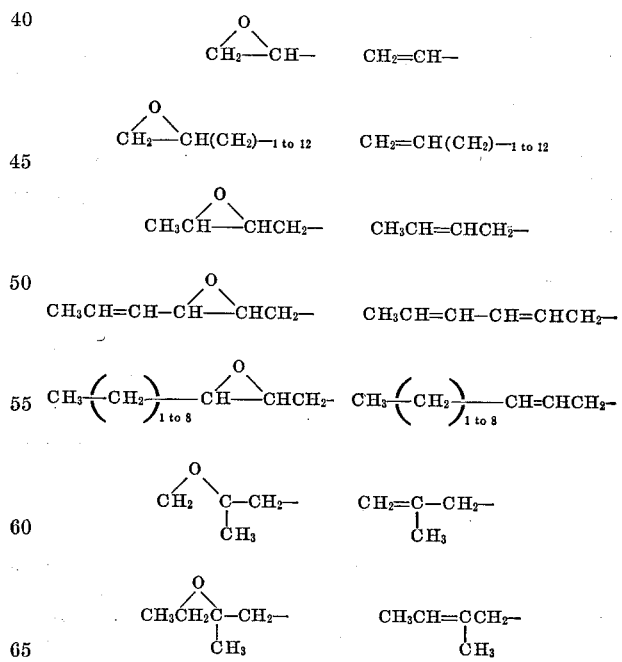

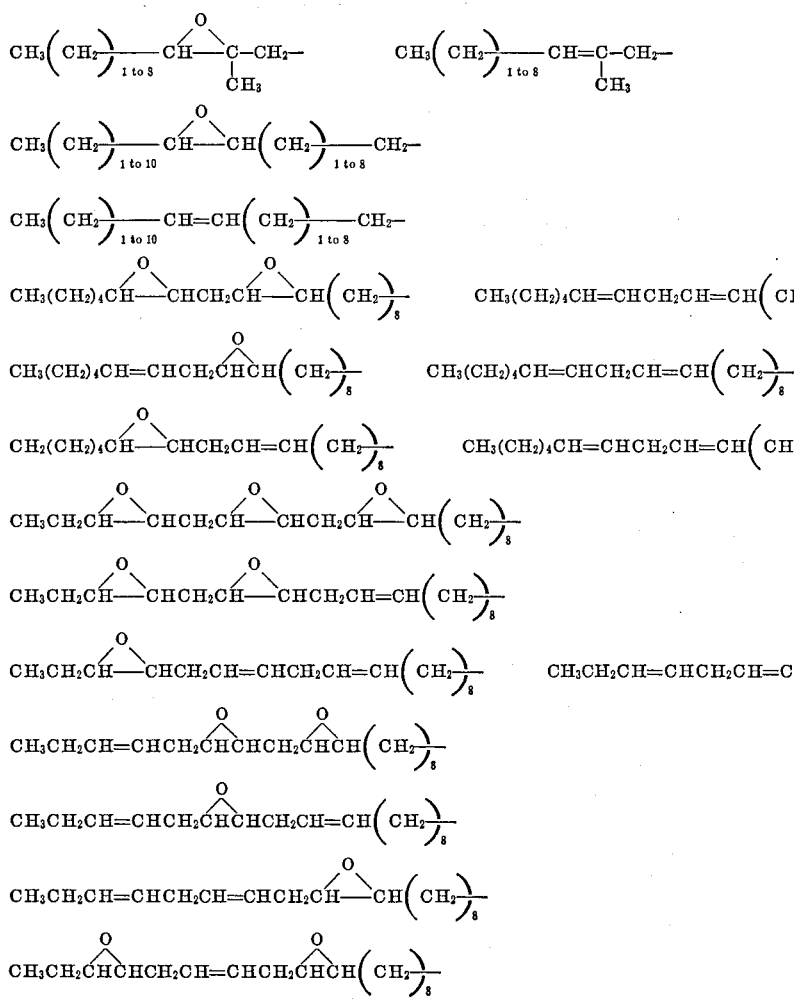

Particularly preferred substituents are epoxy alkyls of from 2 to about 8 carbon atoms and alkenyls of from 2 to about 8 carbon atoms. In a more desirable embodiment of this invention, both groups possess the same number of carbon atoms and the oxirane oxygen bridges the carbon atoms of the alkyl group positioned where the ethylenic unsaturation occurs in the alkenyl group. In the most desirable embodiment of this invention, the 1,4-dioxane is substituted with two (2) vicinal epoxy alkyl groups.

The preparation of the novel oxirane compounds of this invention is achieved by the epoxidation of the corresponding ethylenically unsaturated substituted dioxane wherein the substituent resides at positions on the dioxane moiety as specified above.

The ethylenically unsaturated substituted dioxanes are obtainable by conventional procedures, for example, 2-, 5-, and 6-divinyl-1,4-dioxanes may be obtained by reacting 1,4-dihydroxy-2-butene in the presence of $CuCl_2$. They may be produced also by the Grignard synthesis wherein vinyl magnesium chloride or bromide is reacted with 2,3-, 2,5-, or 2,6-dichloro-1,4-dioxane.

Similarly, other alkenyl magnesium halides may be reacted with 2,3-, 2,5-, or 2,6-dichloro-1,4-dioxane, to give the corresponding dialkenyl-1,4-dioxanes. Particularly useful is the reaction of alkenyl halide by the Grignard synthesis wherein the alkenyl halide is derived from ethylenically unsaturated fatty acids. The unsaturated fatty acids, e.g., linoleic acid, is conventionally reduced to the unsaturated alcohol, e.g., linoleyl alcohol, by reduction only of the carboxyl moiety with a reducing agent such as lithium aluminum hydride and the resulting alcohol is conventionally converted to the halide ester by reaction with such halogenating agents as, e.g., $PCl_3$, $PCl_5$ or thionyl chloride. Of course, the phosphorus bromides may be similarly employed.

The above typical alkenyl radicals, which when bonded to halogen such as chlorine and bromine, are reactable in the Grignard synthesis with 2,3-, 2,5-, or 2,6-dichloro-1,4-dioxane to produce dialkenyl substituted 1,4-dioxanes which are converted by epoxidation into mono or polyepoxides. One or both of the alkenyl radicals bonded to the 1,4-dioxane may be epoxidized.

The Grignard synthesis may be effected at temperatures in the range of about 15° C. to about 100° C. The reaction may be carried out in a solvent inert to the Grignard reaction or the dihalodioxane may be utilized in excess as a solvent for the reaction. Useable inert solvents include, for example, diethyl ether, dibutyl ether, tetrahydrofuran, and the like. The process may be carried out under ambient pressure conditions or at subatmospheric or superatmospheric pressure conditions depending upon the reaction rate desired. Care must be taken in the handling of this reaction to avoid fires and explosions resulting from the use of metallic magnesium.

The resulting 2,3-, 2,5-, or 2,6-dialkenyl-1,4-dioxane may be converted to the epoxide by reaction with an oxirane-forming agent capable of producing vicinal epoxy groups at the site of the ethylenic (olefinic) unsaturation within the compound.

Organic peracids are a particularly desirable class of oxirane forming agents. Useable organic peracids suitable for epoxidation of the aforementioned polyunsaturated compounds include aliphatic peracids, cycloaliphatic peracids, aromatic peracids, and the like. Desirably, the acyl moiety of the peracid exclusive of carbonyl is hydrocarbon. Illustrative of suitable peracids include peracetic acid, perpropionic acid, perbutyric acid, perhexanoic acid, perdodecanoic acid, perbenzoic acid, monoperphthalic acid, and the like. The lower aliphatic peracids containing from 2 to 4 carbon atoms are significantly suitable, and of this class, peracetic acid is the most preferred.

The peracid may be employed as a solution, typically in an inert organic liquid medium such as ethyl acetate, butyl acetate, acetone, and the like. The solution may contain peracid in amounts of from about 10 to about 50 weight percent, preferably from about 20 to about 40 percent by weight of solution.

The epoxidation of the polyolefinic unsaturated compounds described above can be conducted at about 0° C. to about 100° C., although higher and lower temperatures are included as operational. In most cases, temperatures ranging about 25° C. to about 75° C. are preferred.

In a typical operation of this process, the peracid is utilized in an amount sufficient to convert at least one olefinic group in the compound to epoxy. An excess quantity of said peracid insures substantial epoxidation of the polyolefin precursor. For instance, from 1.1 to about 5, or higher, moles of peracid per olefinic double bond

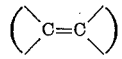

can be employed with advantageous results, though, of course, lower and higher ratios of peracid per each olefinic group is within the purview of this invention. When any of the ethylenically unsaturated 1,4-dioxane compound is epoxidized the resulting compound must have at least one, preferably two, vicinal epoxy groups.

As noted above, the epoxy compounds of this invention may possess olefinic unsaturation. The olefinic unsaturation represents functionality which may be utilized for production of an addition polymer containing a plurality of polymer skeletal chain bonded vicinal epoxy groups or pendant vicinal epoxy groups. These epoxy groups are available for cross-linking or chain extension as hereinafter described.

The epoxy compounds possessing the olefinic unsaturation may be reacted with themselves to produce homopolymers, or with other olefinic unsaturated compounds to form interpolymers, such as co-, ter- or other multi-component polymers, having available

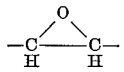

for further reaction.
For example,

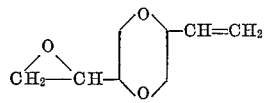

can be homopolymerized or can be co-polymerized with, e.g.,

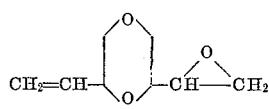

Other olefinically unsaturated compounds which may be employed for polymerization with the dioxane-containing oxirane compounds of this invention include ethylenically unsaturated compounds such as mono- and poly-ethylenically unsaturated hydrocarbons such as ethylene, propylene, butadiene, styrene, alpha-methylstyrene and divinyl benzene; ethylenically unsaturated aldehydes and acetals, e.g., acrolein and diallylidene pentaerythritol; ethylenically unsaturated monocarboxylic acids and esters such as acrylic acid, methacrylic acid, methyl acrylate, ethyl acrylate, butyl acrylate, octyl acrylate, ethyl methacrylate, butyl methacrylate, oleic acid, and 2-ethylhexyl methacrylate, ethylenically unsaturated nitriles such as acrylonitrile and methacrylonitrile; ethylenically unsaturated polycarboxylic acids, anhydrides and esters such as maleic acid, maleic anhydride and alkyl (1 to 18 carbon atoms) maleic esters, and fumaric acid, fumaric anhydride and alkyl (1 to 18 carbon atoms) fumarate esters; polyethylenically unsaturated monocarboxylic acids, such as sorbic acid, linoleic acid and linolenic acid; unsaturated ethers, such as divinyl ether and diallyl ether; alkenyl halides such as allyl chloride, vinylidene chloride and vinyl chloride; ethylenically unsaturated esters of carboxylic acids such as vinyl acetate and diallylcarbonate; alkenyl substituted silanes and siloxanes, such as vinyl silane, vinyl trichloro silane, vinyl trimethyl silane, divinyl dimethyl silane, allyl trimethyl silane, allyl silane, polyvinyl siloxane ($CH_2$=$CHSiO_{3/2}$), poyvinylmethylsiloxane

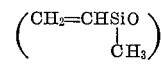

and polyvinyl phenylsiloxane

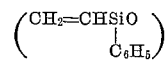

and olefinically unsaturated esters of inorganic acids such as tetra-allyl silicate and triallylphosphate; and the like.

Polymerization of the olefinically unsaturated epoxy compounds indicated above may be effected by conventional free-radical initiation, such as peroxide catalysis, typically by solution or mass polymerization techniques. Useable peroxide catalysts include benzoyl peroxide, hydrogen peroxide, dicumyl peroxide, and di-tertiary butyl peroxide. Polymerization may be effected in an inert solvent for the unsaturated epoxy monomer, or in the monomer per se at a temperature at which the monomer is liquid. Useable inert solvents for this polymerization reaction include the various hydrocarbon solvents such as hexane, heptane, octane, decane, toluene, benzene, xylene and the like; ether solvents such as diethyl ether, dibutyl ether, diisopropyl ether, dioxane, and the like; ketones such as methyl ethyl ketone and methyl isopropyl ketone; esters such as ethyl acetate, propyl acetate, isopropyl acetate, butyl acetate, amyl acetate; or alcohols such as methanol, ethanol, propanol, isopropanol, butanol, isobutanol, and the like. Compatible mixtures of the above solvents may be employed. The solvents to be utilized in the aforementioned addition polymerization reaction should be free of groups which could interfere with reaction, such as olefinic unsaturation.

Polymerization may be sufficient to produce dimers and trimers, etc. of the above monomers, or to produce resinous polymers of up to 100,000 monomer units in size. The addition reaction is typically operated at a temperature above that at which the peroxide catalyst releases free radicals for polymerization. In general, the reaction is carried out at a temperature of from 10° C. to 200° C., preferably at a temperature between 50° C. and 150° C. Greater or lesser temperatures may be employed, depending upon the environmental conditions of reaction and the selection of catalyst; of course, selection of each is well within the skill of the artisan.

The epoxy compounds of this invention which include the addition polymers described above, may be polymerized by reaction with an acidic or basic catalyst capable of opening a vicinal epoxy ring at the site of a carbon to oxygen bond or with an organic reagent possessing a functional group capable of adding to the epoxy compound at the site created by splitting an oxygen to carbon bond of an oxirane ring. Evidence of this bond splitting may be determined by the presence of, e.g., hydroxyl, carbamate, ether and/or ester groups at the sites formerly containing the oxirane oxygen.

The polymerization products of the aforementioned epoxy compounds, effected through what is termed a "condensation type" reaction involving the splitting open of the oxirane radical, may be achieved within a broad temperature range, for example from about 20° C. or lower, to about 300° C. or higher, typically for a period of time sufficient to produce the polymeric product having a molecular weight suitable for the desired use. Thus, the epoxy compounds of this invention may be polymerized to liquid or solid resinous compositions, depending on the degree of polymerization effected, and this is typically dependant upon the amount of acid or basic catalyst or organic reagent employed at the temperature and residence time of reaction. The selection of the desired conditions will become obvious to a skilled worker from the discussion herein and well established knowledge in the art.

The acidic and basic catalysts which can be employed in the "condensation type" reaction include Lewis acids of the non-metal and metal halide class, such as boron trifluoride, aluminum chloride, zinc chloride, stannic chloride, ferric chloride, boron trifluoride-piperidene complex, boron trifluoride-1,6-hexamethylene diamine complex, boron trifluoride-monoethylamine complex, boron trifluoride-dimethyl ether complex, boron trifluoride-diethyl ether complex, boron trifluoride-dipropyl ether complex, ammonium borofluoride, zinc borofluoride, and the like; the strong mineral acids, e.g., hydrochloric acid, sulfuric acid, phosphoric acid, polyphosphoric acid, perchloric acid, and the like; the saturated straight, branched chain or cycloaliphatic hydrocarbon sulfonic acids and the aromatic hydrocarbon sulfonic acids, e.g., ethanesulfonic acid, propanesulfonic acid, cyclohexane sulfonic acid, benzenesulfonic acid, toluenesulfonic acid, naphthalenesulfonic acid, lower alkyl (1 to 18 carbon atoms) substituted-benzenesulfonic acid, and the like; the alkali metal hydroxides, e.g., sodium hydroxide, potassium hydroxide, and the like; the alkali metal carbonates such as sodium, potassium and lithium carbonate, bicarbonate and/or sesquicarbonate, and the like; the tertiary amines and quaternary ammonium compounds, e.g., alpha-methylbenzyldimethylamine, dimethylethylamine, triethylamine, tripropylamine, tetramethylammonium hydroxide, benzyltrimethylammonium hydroxide and the like.

Catalyst concentration and temperature of reaction, as indicated above, typically affect the degree of polymerization and, as well, affect the rate of polymerization. For example, high catalyst concentration and temperature usually promote faster reaction rates. The catalyst concentration, of course, is variable over a broad range depending upon the temperature of reaction employed and the degree and rate of polymerization desired. In general, a catalyst concentration may be employed from about 0.005 to 15 percent, preferably from about 0.01 to 5 percent, based on the weight of the oxirane component.

As indicated above, polymerization through the "condensation" route can be effected utilizing a catalyst system or through reaction with an organic reagent. With respect to these organic reagents, the organic reagent becomes integrally bound in the resulting polymer, and for this reason, can be termed a copolymeric reactant. Of course, the variety of reactants will determine whether the polymer is termed a copolymer, a terpolymer, etc. The organic reagent possesses functional groups capable of reacting with the vicinal epoxy or capable of reacting with the derivative of the oxirane formed by utilizing an agent capable of splitting open the ring so as to provide a hydroxyl group. The reagent typically possesses a functional group which is directly bound to carbon and, in most cases, the reagent predominates in carbon and hydrogen relative to the molar quantity of other elements making up the reagent.

The reagent is capable, depending upon the amount employed, of inter-reaction with the epoxy compounds of this invention to produce in specific instances, thermoplastic and thermosetting resins either in liquid or solid state.

Illustrative organic reagents include polycarboxylic acids, carboxylic acid anhydrides, polyols, polyesters containing chain terminating hydroxyl or carboxyl groups, primary amines, polyamino compounds wherein at least two nitrogen atoms thereof contain at least one bonded hydrogen atom each, polythiols, polyisocyanates, polyisothiocyanates, polyacylhalides, and similar compounds possessing functional groups suitable for reaction with the epoxy groups contained in the compounds of this invention. Moreover, the reagents may be employed in conjunction with the aforementioned catalysts.

The aforementioned catalysts and reagents are frequently termed hardeners in that they cause a degree of polymerization which may result in a solid product.

The reagent can be added to the epoxy compounds of this invention by simple mixing therewith, preferably with sufficient vigor so as to provide a homogeneous mixture. The order of addition of the reagent and the epoxy compound in the mixing procedure does not appear critical though it is often found desirable to first add the component, i.e., the reagent or the epoxy compound, that has the lower viscosity. This will ensure more rapid mixing of the components. If either one or both of the components are solid, and mixing is effected in the absence of a solvent, heat may be applied to the solids in an amount sufficient to cause melting thereof and allow inter-mixture of the two components. The application of heat should not be prolonged to the extent that appreciable curing takes place during mixing.

Various polyfunctional compounds of the above classes may be effectively employed as an organic reagent in the practice of this invention and many of these are hereinafter illustrated. Illustrative of polycarboxylic acids include oxalic acid, malonic acid, succinic acid, glutaric acid, adipic acid, pimelic acid, suberic acid, azelaic acid, sebacic acid, alkylsuccinic acids, alkenylsuccinic acids, maleic acid, fumaric acid, itaconic acid, citraconic acid, mesaconic acid, muconic acid, alpha-dihydromuconic acid, beta-dihydromuconic acid, diglycolic acid, dilactic acid, thiodiglycolic acid, 4-amyl-2,5-heptadienedioic acid, 3-hexynedioic acid, 1,2-cyclohexanedicarboxylic acid, 1,4-cyclohexanedicarboxylic acid, phthalic acid, isophthalic acid, terephthalic acid, tetrahydrophthalic acid, tetrachlorophthalic acid, 1,8-naphthalenedicarboxylic acid, 3-carboxycinnamic acid, 1,2-naphthalenedicarboxylic acid, 1,1,5-pentanetricarboxylic acid, 1,2,4-hexanetricarboxylic acid, 2-propyl-1,2,4-pentanetricarboxylic acid, 1,2,3-propanetricarboxylic acid, 1,2,4-benzenetricarboxylic acid, 1,3,5-benzentricarboxylic acid, 3-hexene-2,2,3,4-tetracarboxylic acid, 1,2,3,4-benzenetetracarboxylic acid, 1,2,3,5-benzenetetracarboxylic acid, benzenepentacarboxylic acid, benzenehexacarboxylic acid, and the like. Copolymers of acrylic or methacrylic acid and an olefinically unsaturated monomer such as butadiene, styrene, ethyl acrylate, vinyl halide, and the like, also can be employed. In addition, the dimerized and trimerized unsaturated fatty acids of, for example, linoleic acid, oleic acid, linolenic acid, undecylenic acid, and the like, are useful. Polycarboxylic acids which have melting points below about 250° C. are desirable.

Illustrative polycarboxylic acid anhydrides include the aliphatic, aromatic, and cycloaliphatic acid anhydrides. The preferred anhydrides are the dicarboxylic acid anhydrides, and preferably, the hydrocarbon dicarboxylic acid anhydrides which include, for example, phthalic anhydride, tetrahydrophthalic anhydride, hexahydrophthalic anhydride, chlorendic anhydride, maleic anhydride, chloromaleic anhydride, dichloromaleic anhydride, citraconic anhydride, isocitraconic anhydride, glutaric anhydride, adipic anhydride, succinic anhydride, itaconic anhydride, heptylsuccinic anhydride, hexylsuccinic anhydride, methylbutylsuccinic anhydride, methyltetrahydrophthalic anhydride, n-nonenylsuccinic anhydride, octenylsuccinic anhydride, pentenylsuccinic anhydride, propylsuccinic anhydride, 4-nitrophthalic anhydride, 1,2-naphthalic anhydride, 2,3-naphthalic anhydride, 1,8-naphthalic anhydride, tetrabromophthalic anhydride, tetraiodophthalic anhydride, and the like. Polycarboxylic acid anhydrides which have melting points below about 250° C., are desirable.

Illustrative of useable polyols include, the aliphatic and cycloaliphatic polyhydric alcohols, e.g., ethylene glycol, diethylene glycol, tri-, tetra- and other polyethylene glycols, propylene glycol, di-, tri-, tetra- and other polypropylene glycols, the polyethylenepolypropylene glycols, trimethylene glycol, the various isomers of butanediol, 2-butene-1,4-diol, the various isomers of pentanediol the various isomers of pentenediol, 2-ethyl-1,3-hexanediol, the various isomers of hexenediol, 2-methoxy-2,4-dimethyl-1,5-pentanediol, 12,13-tetracosanediol, polyglycerol, 1,1,1-trimethylolpropane, pentaerythritol, sorbitol, the polyvinyl alcohols, the various isomers of octenediol, the various isomers of cyclopentanediols, the various isomers of cyclohexanediols, the various isomers of the lower alkyl (1 to 8 carbon atoms) substituted-cyclohexanediols, inositol, trimethylolbenzene, and the polyhydric phenols, e.g., resorcinol, catechol, pyrogallol, hydroquinone, the dihydroxytoluenes, dihydroxyxylene, bis(4-hydroxyphenyl)-2,2-propane, bis(4-hydroxyphenyl)methane, 1,9-naphthalenediol, the polyhydric phenol-formaldehyde condensation products, and the like. The alkylene oxide adducts, e.g., ethylene oxide, propylene oxide, etc., of polyhydric alcohols or polyhydric phenols such as those illustrated above also are highly suitable. Polyols having melting points below about 250° C., are desirable.

The primary amines which may be employed as reagents herein include any organic compound bearing a single nitrogen atom directly bonded to carbon of the compound and containing two hydrogen atoms directly bonded to the nitrogen. Significantly desirable primary monoamines include those having the formula $$R°NH_2$$

wherein R° is a radical such as alkyl, alkenyl, cycloalkyl, cycloalkenyl, aryl, alkaryl and aralkyl. Illustrative primary amines include methylamine, ethylamine, n-propylamine, isopropylamine, n-butylamine, 2-ethylhexylamine, dodecylamine, octadecylamine, allylamine, 2-butenylamine, 11-undecenylamine, cyclohexylamine, cyclopentylamine, cyclobutylamine, the cyclobutenyl, cyclopentenyl, cyclohexenyl, cycloheptenyl, and cyclooctenyl amines, phenylamine, the naphthylamines, the anthracylamines, the xylyl and tolylamines, benzylamine, and the like.

Illustrative polyamino compounds include aliphatic, aromatic, and cycloaliphatic amines and amides containing at least two nitrogen atoms each of which possesses a bonded hydrogen atom, as e.g., is the case with hydrazine, such as hydrazine, sym-dimethyl hydrazine, unsym-dimethyl hydrazine, sym-diphenyl hydrazine, unsym-diphenyl hydrazine; alkylene diamines such as ethylene diamine, N,N'-dimethyl ethylene diamine, N,N-diphenyl ethylene diamine, other alpha-omega alkylene diamines of from 3 to 12 carbon atoms such as the aforementioned primary and secondary ethylenediamines; polyalkylenepolyamines such as diethylenetriamine, 4 - methyldiethylenetriamine, triethylenetetraamine, 4,7-dimethyltriethylenetetramine, and polyalkylenepolyimines from polymerization of ethylene imine; heterocycloaliphatic amines such as piperazine, 2-methylpiperazine, 2,5-dimethylpiperazine, 2,3,5,6-tetramethylpiperazine, and other lower alkyl (2 to 8 carbon atoms) substituted piperazines as above described; aromatic polyamines such as 1,4-phenylenediamine, 1,3-phenylenediamine, 4-aminobenzylamine, bis(1,4-diaminomethyl)benzene, bis(1,4-diaminopropyl)benzene, and bis(4-aminophenyl)amine; cycloaliphatic polyamines such as 1,4-diaminocyclohexane, 1,3 - diaminocyclohexane, 1,2 - diaminocyclohexane, 1,3 - diaminocyclopentane, 1,3 - diaminocyclobutane, and 1,4-diaminocycloheptane, and the like; amine substituted heterocyclics such as melamine and gamma-aminopropyl methyl siloxane cyclic tetramer; compounds containing amido groups having N-substituted hydrogen such as urea, biuret, semicarbazide, N,N'-dialkyl urea, guanidine, thiourea, adipamide, succinamide, sebacamide, polyamides such as polyhexamethylene adipamide, poly-ε-caprolactam (poly-ε-aminocaproic acid), polypyrrolidone, polyurethanes such as the reaction product of tolylene diisocyanate and ethylene glycol, and the like.

Illustrative polythiols includes the aliphatic, cycloaliphatic and aromatic polythiols such as 1,2-dimercaptoethane, the remainder of the series of alkylene (2 to 12 carbon atoms) alpha, omega-dithiols, 1,4-dimercaptobenzene, 1,4-dimercaptocyclohexane, and the like.

Illustrative of polyisocyanates include the aliphatic, cycloaliphatic and aromatic polyisocyanates. The following illustrative list of polyisocyanates are also representative of polyisothiocyanates by substituting the oxygen of the isocyanato group with a sulphur atom. The polyisocyanates of this invention include alpha-omega alkylene (1 to 12 carbon atoms) diisocyanates, 1,4-phenylene diisocyanate, bis(4-isocyanatophenyl)amine, toluene-2,4-diisocyanate, toluene-2,6-diisocyanate, toluene-2,4,6-triisocyanate, 2,4,4'-triisocyanate diphenyl ether, bis(4 - isocyanatophenyl) - 2,2' - propane, bis(4 - isocyanatophenyl)methane, and the like.

Polyacylhalides within the purview of this invention include the acyl halides (e.g., acyl chlorides and bromides) of the aforementioned polycarboxylic acids and anhydrides. Also, esters of the aforementioned polycarboxylic acids of their anhydrides may be employed. This includes polyesters formed from the reaction of a polyol and the aforementioned polycarboxylic acids, their anhydrides or acid halides. Illustrative of the polyesters are those from the reaction of phthalic acid and pentaerythritol modified or unmodified with fatty acids such as the acids of linseed oil, soybean oil, and cottonseed oil; polyesters such as those obtained from the condensation of terephthaloyl chloride and ethylene glycol; and other polyesters of the alkyd resin class such as the condensation product of maleic acid, glycerine and vegetable oil.

The above class of organic reagents possess functionality in the form of reactive groups capable of splitting open the oxirane ring of the epoxy compounds or compositions of this invention, whereby to effect reaction therewith and cause the production of a resinous composition of a molecular weight greater than that of the starting epoxy composition or compound. The functional group of the polycarboxylic acids, their anhydrides or acid halides, is the carbonyloxy

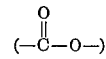

moiety. With respect to the polyols, the hydroxyl (—OH) group is the functional group. In the case of the polyesters, either the terminating carboxyl or non-carbonyl bonded hydroxyl groups represent its functionality. With respect to the amino compounds, the nitrogen having a bonded hydrogen represents the functional group. It is to be understood that if a nitrogen atom has two bonded hydrogen, the compound is at least difunctional. In the case of polythiols, the mercapto group is the functional group, and with polyisocyanates and polyisothiocyanates, the isocyanato or isothiocyanato moieties represent the functional groups.

The organic reagent may be employed in amounts so as to provide from about 0.001 to about 15.0, usually from about 0.01 to 5.0, functional groups thereof per vicinal epoxy group of said epoxy compounds and compositions of this invention. Desirably, a ratio of from about 0.1 to about 3.5 of the functional groups to the epoxy groups is employed. In preferred operation, this ratio is from 0.5 to 2.0. Oftentimes a 1 to 1 ratio of functional groups to epoxy group is found significantly desirable.

In many instances it is desirable to add the reagent to the epoxide composition in two steps. The first addition typically utilizes an amount of reagent whereby to provide a low ratio of functional groups per epoxide group, say from about 0.01 to about 0.8 so that the resulting condensation product has a viscosity indicating a low state of polymerization. This product is termed an intermediate stage resinous composition comparable to an A-stage resin. The ultimate molecular weight polymer obtainable from the reaction of a particular reagent and epoxide indicates whether an intermediate polymerized state is reached in any given instance.

Reaction between the reagent and the aforementioned epoxy compounds or compositions (i.e., the aforementioned addition polymers of the epoxy compounds) of this invention can be effected within a broad temperature range such as from about 20° C. to about 300° C. Higher and lower temperatures are also included. In most cases the reaction will be effected at between about 75°C. and 200° C.

The reaction may be effected in the presence or absence of a solvent. Of course, it is most desirable to effect the reaction at a temperature at which the components of the reaction are in liquid state. But if any of the components are not suitably useable in liquid state, it may be dissolved in a solvent therefor, and incorporated in the other component or components of the reaction. In most instances, a solvent can be employed to effect a partially polymerized composition which can be hardened by evaporating the solvent. Of course, this is restricted by the nature of the product which is dissolved. If the product of reaction between the epoxy compounds of this invention and the organic reagent form a thermosetting resinous composition free of ethylenic unsaturation capable of oxidizing to a cured state at low temperatures (such as those provided in fatty acids such as linoleic acid), then additional heat typically above 50° C. is necessary to achieve not only solvent evaporation, but complete thermoset of the resinous composition. On the other hand, if the resinous composition comprises a thermoplastic reaction product, simple evaporation of the solvent at any convenient temperature will result in a solid thermoplastic mass.

In any event, use of solvent in the polymerization reaction is oftentimes desirable regardless of the fusibility of the reaction product. The solvent should be inert to the reactants or reaction product, liquid at the temperature of use and compatible with at least one of the reactants, preferably compatible with all of the components of the reaction as well as the resulting reaction product. The most desirable solvents are organic and include such chemicals as xylene, toluene, mineral spirits, specific aliphatic hydrocarbons such as n-hexane, n-heptane, n-octane, 2-ethylhexane, methyl isobutyl ketone, methyl isopropyl ketone, ethyl acetate, butyl acetate, amyl acetate, and the like. It is preferred that the aforementioned esters not be used as a solvent during the reaction between the organic reagent and the epoxides. On the other hand, they are most desirably employed as a solvent for the product from the reaction of these two components.

Thermoplastic materials can be obtained by simple addition polymerization of the aforementioned epoxy compounds in the manner described above. Of course, the amount of functionality possessed by the components undergoing reaction is a critical factor. Thus, if the epoxy compound possesses only one ethylenically unsaturated moiety and is reacted with itself or another monoethylenically unsaturated compound, the resulting polymeric product will typically be thermoplastic. Of course, polyolefinically unsaturated monomers may be incorporated in this reaction, but to obtain a thermoplastic product they should not be present in an amount in excess of 5 mole percent based on total moles present in the reaction.

Thermoplastic resins may also be obtained by reacting the aforementioned reagents or catalysts with monoepoxides of the dioxane compounds of this invention. In view of the monoepoxy functionality, a substantially linear polymer is obtainable upon reaction with the aforementioned reagents and catalysts, particularly when the reagent possesses not more than two functional groups.

Thermoset resinous compositions are obtainable by reaction of the di-, tri-, tetra- and other poly-epoxides with the aforementioned reagents and catalysts, or the monoepoxide with a reagent having at least two functional groups. If the resinous compositions obtainable from reaction with the catalyst or reagents possess residual olefinic unsaturation, further cross-linking of the compositions can be effected by incorporating the aforementioned free-radical initiators and heating the composition to a final cure.

The epoxy products of this invention are significantly suitable for use as surface coating materials, molding resins, films, adhesives, and the like.

By applying the polyepoxide of this invention to textile fabrics, disadvantages inherent in previous textile finishing have been overcome to give a fabric which is soft, white, and has a high degree of crease recovery, and shrink resistance. Cellulosic textile fabrics treated by the process of this invention retain these properties well after repeated laundering and are not subject to chlorine retention. Both the whiteness and the original strength of the fabrics are retained to a high degree. Treatment by this method represents a substantial improvement over other finishes heretofore available.

Application of the polyepoxide to the fabric is best effected from an aqueous medium. The term "aqueous medium" as used throughout the specification and claims is intended to encompass textile treating solutions wherein the solvent medium is solely water, mixtures of water and emulsifying agents, or mixtures of water and organic solvents miscible with water.

The use of emulsifying agents or organic solvents may be needed, however, in those instances when water insoluble components are added to the textile treating solution. Among the emulsifying agents and solvents which can be employed if required are methylcellulose, hydroxyethylcellulose, carboxymethylcellulose, sodium alginate, polyvinyl alcohol, polyethylene oxide, toluene, xylene, the lower aliphatic alcohols such as ethyl alcohol, butyl alcohol, isopropyl alcohol, acetone, esters, and the like. The concentration of emulsifying agent is not necessarily critical and can vary in amounts from about 0.1 to 15 percent of the solution.

While the curing step can be accomplished by heating, it can be accelerated by the use of a suitable curing catalyst. The catalysts employed are the so-called "acid-acting" curing agents or epoxy curing agents which include not only acids but compounds capable of acting as acids, such as acidic salts, Lewis acids, and the like. Examples of the acid-acting or epoxy curing agents include, among others, organic and inorganic acids and their anhydrides, such as phosphoric acid, hydrochloric acid, boric acid, the alkane sulfonic acids, perchloric acid, persulfuric acid, p-toluenesulfonic acid, citric-acid, acetic acid, acetic acid anhydride, butyric acid, caproic acid, phthalic acid, phthalic acid anhydride, tartaric acid, oxalic acid, succinic acid, succinic acid anhydride, fumaric acid, glutaconic acid, malonic acid, acetoacetic acid, and naphthalic acid; metal salts such as the fluoborates of magnesium, tin, cadmium and sodium as well as zinc, boron trifluoride etherate, stannic chloride, aluminum chloride, magnesium chloride, sodium sulfate, zinc sulfate, and aluminum sulfate, and amine hydrohalides such as hydrochlorides of aniline, n-propylamine, di-n-butylamine, dibenzylamine, triethylamine, alpha-phenylethylamine, alpha-naphthylamine, beta-aminoanthraquinone, 1,3-diaminoanthraquinone, piperidine, pyridine, quinoline, morpholine, pyrrole and guanidine, and hydrochlorides of hydroxyamines as 2- amino-2-methylpropanol and isobutanol amine. The amount of catalyst employed is not necessarily critical and can vary in amount from about 0.01 percent to about 10 percent by weight of the solution, with a preferred range of from about 0.1 percent to about 5 percent.

The optimum amount of polyepoxide to be applied to the textile material is an amount sufficient to give a desired wash-and wear rating of 4 or 5 as hereinafter indicated. A preferred method is to immerse the fabric in an aqueous medium containing from about 1 to about 30 percent by weight of the polyepoxide, and from 0.01 to 10 percent of the curing catalyst and then pass it through a squeeze roller. A second immersion and squeezing can be effected if necessary, leaving the fabric impregnated with approximately 60 to 100 percent of its own weight of solution. After this padding procedure, the fabric is mounted on a pin frame and dried at relatively low temperatures to remove water. While drying may be accomplished by allowing the fabric to remain in contact with the air, a temperature range of from about 95° F. to about 175° F. for 5 to 1 minutes is preferred. Since the drying time is not critical, a wider range of drying temperature can be employed equally as well.

Upon drying the fabric is "cured" at a temperature sufficient to promote the reaction of the polyepoxide with the fibrous material being treated. Temperatures from about 240° F. to about 400° F. and more preferably from about 275° F. to about 350° F. can be employed for periods ranging from about 15 seconds to about 5 minutes, with the higher temperatures using the shorter curing period. After the curing step, the fabric is scoured to remove unreacted polyepoxide or epoxy curing catalyst. Scouring is effected by washing in hot water (approximately 170° F.) containing a small quantity of detergent. The scouring conditions themselves are not critical as long as unreacted material is removed from the fabric. After scouring, the fabric is dried and evaluated.

In another aspect of the present invention, the textile treating solutions can include mixtures of one or more polyepoxides and one or more known textile finishes, including the nitrogen-containing finishes, either alone or in the presence of an epoxy curing catalyst. The undesirable yellowing effect of the nitrogenous textile resins after chlorine bleaching when such resins are used as the sole finish for white goods, is eliminated or greatly reduced when employed in conjunction with polyepoxides. Excellent results are obtained, for example, by the use of the instant polyepoxide in conjunction with the melamine-formaldehyde resins, 1,3-dimethylol-5-ethyltetrahydro-5-triazin-2(1H)-one; mono- and dimethylol ureas, mono- and dimethylol ethylene ureas, methylated methylol ureas, and the like.

As previously indicated, the use of blends of the bis(epoxyalkyl)dioxane and formaldehyde are of particular interest for imparting the desired shape-holding properties to textile fabrics. Since the bis(epoxyalkyl) dioxanes are resistant to acid hydrolysis, they are ideally suited for use in conjunction with the less expensive formaldehyde. Moreover, their combined use has a synergistic effect and imparts a high degree of crease recovery and breaking strength retention than the use of a comparable amount of each finish alone. In practice when mixtures of the polyepoxide and formaldehyde are employed, the polyepoxide should comprise at least 15 weight percent and more preferably from about 15 to about 90 weight percent based on the weight of the mixture.

The textile treating solution employed for imparting the wash-and-wear characteristics to the cellulosic or cellulosic-containing materials can also contain, in addition to the aforementioned polyepoxides, plasticizers, natural resins, textile softening agents, and the like.

In the evaluation hereinafter of the properties of the treated fabric, the following tests were conducted.

(a) Breaking strength; measured by the raveled strip method. American Society for Testing Materials D-39-49 (warp direction only).

(b) Crease recovery; measured with the Monsanto tester. American Society for Testing Materials D1295-53T (warp direction only). By this test the ability of a fabric to recover from a crushing fold is measured.

(c) Wash-and-wear evaluation; by means of the following scale, the wash-and-wear properties of the treated material were evaluated.

| Scale: | Evaluation |
|---|---|
| 5 | As ironed. |
| 4 | Wearable. |
| 3 | Needs ironing. |
| 2 | Not acceptable. |
| 1 | Very wrinkled. |

Ref.: Textile Research Journal, 26, 974 (1956); American Dyestuff Reporter 48, 37 (1959).

(d) Color; the yellowness of the treated fabric was determined by comparison with the original bleached fabric. The yellowness index was determined using a Hunter multipurpose reflectometer. This abridged spectrophotometer employs three filters in measuring the 45°, 0° reflectance of a fabric with respect to amber, green and blue light. A simple yellowness index is provided by $$\text{Yellowness} = \frac{A-B}{G}$$

where A, B and G represent the reflections in amber, blues and green light, respectively. The index so obtained correlates closely with subjective evaluations. A white fabric has a yellowness which approaches zero, while an index in the range of 0.2 to 0.3 describes a very yellow sample.

(e) Dry add-on; determined by measuring the increase in weight of the fabric after treatment with the polyepoxide and scouring to remove unreacted material; is a measurement of the total epoxide which had reacted with the fiber.

The term "cellulosic and cellulosic-containing textile materials" as used throughout the specification and claims is intended to include cellulose or cellulose-containing fibers, whether in the finished state or at some intermediate stage in processing; cellulose and cellulose-containing fabrics whether woven or knitted; and garments or other articles made from such fabrics. Thus, materials containing cellulose, regenerated celluose, and mixtures of the two are intended to be within the scope of the present invention.

The resinous compositions may also be blended with other resins whereby to modify the characteristics of the products of this invention. Thus, the resins of this invention may be intermixed with nitrocellulose lacquers, vinyl chloride polymers, vinyl acetate polymers, vinyl alcohol polymers, polyacrylates such as polyethylacrylate, polyacrylamides such as copolymers of acrylamide and butylacrylate reacted with formaldehyde, and the like.

The following examples serve to illustrate specific embodiments of this invention which are not intended to limit the scope of this invention.

EXAMPLE I

One thousand grams of 2-butene-1,4-diol and 50 grams cupric chloride is heated at reflux for about 4 hours. Distillation yields 519 grams of a mixture of 2,5- and 2,6-divinyl-1,4-dioxane, boiling at 62–64° C. at 15 millimeters of Hg. This material is used without further purification.

EXAMPLE II

To two hundred and forty-five (245) grams (1.75 moles) of the mixture of Example 1 charged to a 2-liter flask, is dropwise added 1202 grams of a 24.2 weight percent peracetic acid in ethyl acetate solution. The temperature of the reaction mixture is kept at 60° C. with external heating. The addition is effected in 3.5 hours. The temperature is maintained at 60° C. for an additional 2.5 hours, and then at a room temperature overnight. Titration of unreacted peracetic acid shows the reaction to be 82.4 percent complete.

The reaction mixture is fed dropwise into 1000 grams acetate. After an additional three hours at 60° C., the mixture is freed of volatiles by distillation and the resulting residue is fractionally distilled to yield 2-allyl-3-(2,3-epoxypropyl)-1,4-dioxane and 2,3-bis(2,3-epoxypropyl)-1,4-dioxane.

EXAMPLE V.—RESINS WERE PREPARED BY MIXING BIS(EPOXYETHYL)-1,4-DIOXANE (0.9 GRAM) AND VARIOUS HARDENERS AS INDICATED IN THE FOLLOWING TABLE

| Hardener | Grams | Ratio [1] | Gel Time Min., °C. | Cure Hrs., °C. | Resin Description |
|---|---|---|---|---|---|
| Diethylene-triamine | 0.22 | 1.0 | 15, 26 | 30, 26; 2.5, 80, 6, 160 | Tough Barcol, 29 [2]. |
| Methylene-dianiline | 0.5 | 1.0 | >15, 80 | 3, 80; 6, 160 | Barcol, 65. |
| KOH | [3] 0.02 | | 3 hrs., 80; >20, 120 | 3, 80; 7.5, 120; 6, 160 | Barcol, 60. |
| BF$_3$-monoethylamine | 0.09 | | 3 hrs., 80; >20, 120 | 3, 80; 7.5, 120; 6, 160 | Hard, brittle. |
| Phthalic anhydride | 0.93 | 1.25 | 10.5 hrs., 120; >60, 160 | 10.5, 120; 7, 160 | Barcol, 63. |
| Adipic acid | 0.55 | 0.75 | 5.5-10 hrs., 120 | 10.5, 120; 6, 160 | Barcol, 64. |

[1] Ratio of reactive groups from the hardener per one epoxide group.  [2] Barcol Impressor, GYZJ 934-1.  [3] Added as 17% solution in ethylene glycol.

EXAMPLE VI

A sample of cotton printcloth was immersed in solutions containing 10% bis-(epoxyethyl)-1,4-dioxane, 2.0% non-ionic surfactant (Triton X-100), and zinc fluoborate as indicated below. The samples were dried for 3 minutes at 75° C. and cured for 3 minutes at the temperature indicated. The results follow—

| Sample: | ZnB$_2$F$_8$, Percent | Curing Temperature, °C. | Add-on Before Scour, Percent | Add-on After Scour, Percent | Wash Wear Index | Yellowness Index | Crease-Recovery, Percent | Breaking Strength Retained, Percent |
|---|---|---|---|---|---|---|---|---|
| 1 | 0.5 | 120 | 8.3 | 4.1 | 3 | 0.04 | 57 | 65 |
| 2 | .5 | 160 | 8.7 | 5.9 | 3 | .05 | 61 | 52 |
| 3 | .5 | 200 | 8.8 | 6.5 | 5 | .06 | 68 | 52 |
| 4 | 2.0 | 120 | 12.8 | 9.1 | 4 | .05 | 70 | 54 |
| 5 | 2.0 | 160 | 12.5 | 9.9 | 5 | .06 | 76 | 44 |
| 6 | 2.0 | 200 | 11.9 | 10.2 | 5 | .08 | 77 | 47 |
| Untreated Cotton | | | | | 1 | .04 | 44 | 100 (54 lbs.) | of ethyl benzene refluxing at 30 milliliters of Hg and volatiles are stripped by distillation. The residue is partially liquid and partially waxy. After distilling the waxy solid on a gooseneck apparatus, there are obtained 109 grams of monoxide and dioxide liquid mixture and 105 grams of dioxide in solid form. The solid material is 94 percent bis(1,2-epoxyethyl)-1,4-dioxane.

Analysis of the recrystallized solid shows the following results.—Calcd. for $C_8H_{12}O_4$: C, 55.81; H, 6.98. Found: C, 56.63; H, 7.19.

Infrared analysis confirms the structure. The 105 grams of solid represents a yield of 35 weight percent of the dioxide. The mixture of monoxide and dioxide, 109 grams, represents an additional 40 weight percent yield, based on the divinyldioxane.

Utilizing longer reaction times there is obtained a yield of solid dioxide of 58 weight percent and a yield of monoxide of 16 weight percent indicating an efficiency of about 75 percent.

EXAMPLE III

To 210 grams of divinyldioxane at 50° C. is added dropwise with stirring 1192 grams of 23.9 weight percent solution of peracetic acid in ethyl acetate. The addition is carried out over two hours after which the temperature is raised to 55° C. After an additional four hours at 55-60° C., the solution is allowed to stand overnight at room temperature. The solution is then heated to 60° C. for two hours at which time the reaction is 93 percent complete as indicated by titration for peracetic acid. The volatiles are removed and the residue is flash-distilled to give 38 grams of vinylepoxyethyl-1,4-dioxanes, boiling point 60-82° C. at 0.4 millimeter of Hg $n_D^{30}$ 1.4670, and 175 grams of bis(epoxyethyl)-1,4-dioxane; boiling point 95° C./0.5 mm.

EXAMPLE IV

To one mole of 2,3-diallyl-1,4-dioxane, prepared according to the Grignard synthesis by reacting allyl magnesium bromide with 2,3-dichloro-1,4-dioxane in diethyl ether at 25° C., which is maintained with stirring at 60° C., there is added, dropwise, over a period of two hours, two moles of a 24 weight percent solution of peracetic acid in ethyl

What is claimed is:
1. 2-allyl-3-(2,3-epoxypropyl)-1,4-dioxane.
2. 2,3-bis(2,3-epoxypropyl)1,4-dioxane.
3. In a process for treating cellulosic and cellulosic containing textile material whereby said material is rendered both shrink-resistant and has a high degree of crease recovery while retaining softness and whiteness, the improvement comprising impregnating said textile material with an oxirane compound of the formula

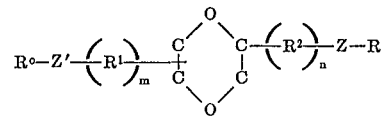

wherein R and R° are each selected from the group consisting of hydrogen, vicinal epoxyalkyl of from 2 to about 8 carbon atoms, alkyl of from 1 to about 8 carbon atoms and alkenyl of from 1 to about 8 carbon atoms; R$^1$ and R$^2$ are each selected from the group consisting of alkylene and alkenylene, each member of said group having from 1 to about 12 carbon atoms; Z and Z' are each selected from the group consisting of

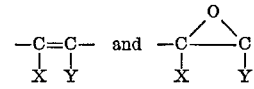

wherein X and Y are each selected from the group consisting of hydrogen and alkyl of from 1 to about 4 carbon atoms; at least one of Z and Z' is

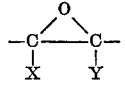

and $n$ and $m$ are each one of the integers 0 and 1 and heating said impregnated textile material.
4. The method of claim 3 where the oxirane compound is 2,5-bis(1,2-epoxyethyl)1,4-dioxane.
5. The method of claim 3 where the oxirane compound is 2,6-bis((1,2-epoxyethyl)-1,4-dioxane.

6. The method of claim 3 where the oxirane compound is a mixture of 2,5-bis(1,2-epoxyethyl-1,4-dioxane) and 2,6-bis(1,2-epoxyethyl)1,4-dioxane.

7. The method of claim 3 where the oxirane compound is 2-allyl-3-(2,3-epoxypropyl)-1,4-dioxane.

8. The method of claim 3 where the oxirane compound is 2,3-bis(2,3-epoxypropyl)-1,4-dioxane.

References Cited

UNITED STATES PATENTS

| | | | |
|---|---|---|---|
| 2,912,439 | 11/1959 | Hasek et al. | 260—340.6 |
| 2,977,374 | 3/1961 | Phillips et al. | 260—2 |
| 3,024,135 | 3/1962 | Sookne et al. | 260—2 |
| 3,231,586 | 1/1966 | Tinsley et al. | 260—2 |
| 3,296,160 | 1/1967 | Miranda | 260—2 |

H. D. ANDERSON, *Primary Examiner.*

T. PERTILLA, *Assistant Examiner.*

U.S. Cl. X.R.

117—139.5, 143, 145, 161; 260—340.6, 2, 834, 836, 67, 823